July 14, 1964   T. STEWART   3,141,132
METER WITH ADJUSTABLE SPIRAL TEMPERATURE COMPENSATOR
Filed May 24, 1960

INVENTOR.
TRIGG STEWART
BY Fulwider, Mattingly
& Huntley
ATTORNEYS

United States Patent Office 3,141,132
Patented July 14, 1964

3,141,132
METER WITH ADJUSTABLE SPIRAL
TEMPERATURE COMPENSATOR
Trigg Stewart, 13229 Lakeshore Drive, Lakeside, Calif.
Filed May 24, 1960, Ser. No. 31,290
5 Claims. (Cl. 324—105)

The present invention relates to an instrument having a rotatable shaft whose movement is counteracted by a spring and in which a bimetallic element is employed for and is connected with the spring.

The present invention relates more particularly to an ammeter which is adapted to measure current generated by a thermocouple. Such thermocouple employs two dissimilar metal conductors, for example copper and constantan, the junction of which, when heated, causes generation of electric current. These conductors are connected with the ammeter for measuring the current. Since the characteristics of the metal and the current generated are known, the temperature at the junction can be determined.

The ammeter may be subjected to changes in temperature and since the constantan is connected to a dissimilar metal at the ammeter, an increase in temperature, at the junction of the constantan with the ammeter, causes a counter electromotive force to be generated causing a false reading of the ammeter.

In practicing the present invention, a bimetallic compensator is employed to impress a force on the counteracting spring at a value sufficient commensurate to counteract the effect of the counter electromotive force. Inasmuch as like lengths of strips of bimetal vary in bending characteristic when subject to like temperature, it is necessary to adjust the lengths of the bimetal for each instrument employing the same.

In practicing the present invention, a spiral type bimetallic compensator is employed. The free end thereof is mechanically connected with the free end of the counteracting spring. The opposite end of the spiral compensator is fixed to the instrument. An adjustable anchor arm is employed for fixing the effective length of the spiral compensator, thus effecting the force generated thereby by the environment temperature. The anchor arm is mounted for pivotal movement about the center of the spiral compensator and is also adjustable radially of said center, i.e., the end of the arm, which anchors the spiral compensator, is movable so that it can follow the spiral path of the compensator and is adapted to be fixed in its adjusted position.

Further objects and advantages will be apparent from the following description, reference being had to the accompanying drawings wherein a preferred embodiment of the invention is illustrated.

Figure 1:
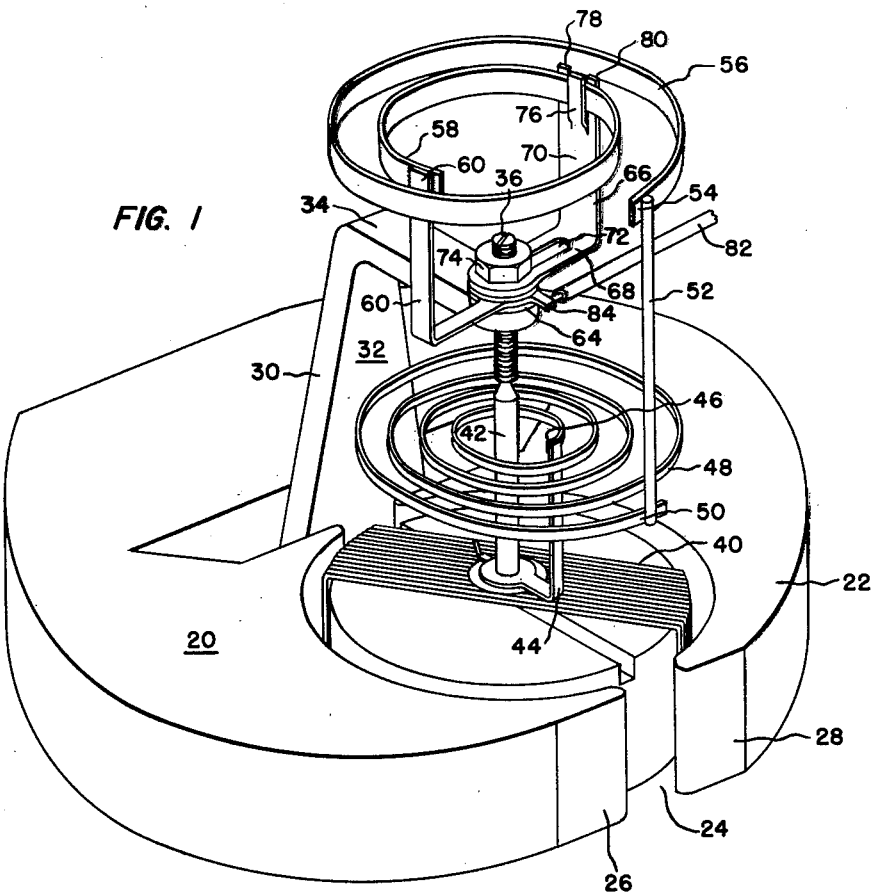
FIG. 1 is a perspective view of the improvements on the meter.
Figure 2:
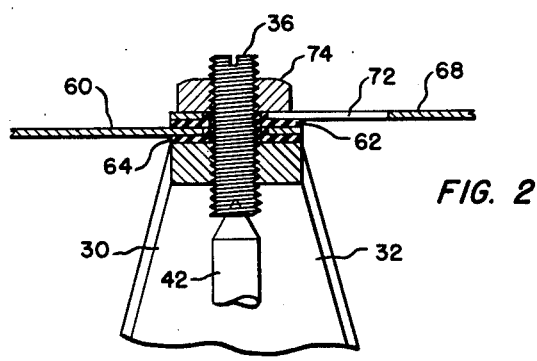
FIG. 2 is a fragmentary sectional view of a portion of FIG. 1.

Referring more in detail to the drawings, the instrument 20 includes a base which carries a permanent magnet 22 of the horseshoe type, the gap of which is shown at 24. This magnet is fixed to the base. The magnet includes the usual pole pieces 26 and 28. The base also carries a frame 30 having a vertically extending leg 32 and two horizontally extending arms; the upper arm 34 only is shown. The lower arm extends below the magnet and the upper arm extends above the magnet. These arms each carry aligned threaded studs 36 which in turn carry jewel bearings (not shown).

A rotatable actuator in the form of an armature 40 is carried by aligned shafts at the bottom and at the top thereof, and are journaled in the jewel bearings. This actuator rotates the shafts. The upper shaft 42 only is shown, but a like shaft is provided at the bottom of the armature. This armature 40 is formed of a coil which is herein referred to as a "meter coil." The lower shaft carries the indicating hand of the meter. The instrument thus far described is of the well known type.

An arm 44 is suitably attached to the shaft 42 and this arm has attached thereto the inner end 46 of a spiral type spring 48. The free or outer end 50 of the spring 48 is connected by a tie bar 52 to the free end 54 of a spiral type bimetallic thermal compensator 56. This compensator is formed of the usual bimetallic metals. The inner end 58 of the spiral compensator is connected to a tie bar 60 which in turn is connected to the frame arm 34 but insulated therefrom by two insulating washers 62 and 64. The tie bar 52 is connected to the free end 50 of the spring 48 and the free end 54 of the spiral compensator 56 by silver solder, and likewise the inner end 58 of spiral compensator 56 is connected to the tie bar 60 by silver solder.

An adjustable anchor arm 66 has a lower horizontally extending leg 68 and a vertically extending leg 70. The lower leg 68 is provided with a longitudinally extending slot 72 which receives the upper end of the threaded stud 36. The upper end of the threaded stud 36 receives a nut 74, which, when tightened, clamps the anchor arm 66 and the tie bar in position above the frame arm 34.

The upper end of the leg 70 of the anchor arm 66 is provided with three tines 76, 78 and 80. The tine 76 lies inwardly of the tines 78 and 80 so as to receive the spiral 56 between the tines 76 and 78 and 80. Thus it will be seen that when the nut 74 is loosened, the arm 66 can be moved radially of the center of the spiral 56 and is pivotally mounted about the center of the spiral. When the adjustable anchor arm 66 is moved counterclockwise from the position shown, the effective length of the spiral is increased, and, conversely, when the anchor arm is moved to a position clockwise of that shown, the effective length of the spiral compensator 56 is decreased. In this manner the effectiveness of the compensator, for a given temperature, can be adjusted and then held in adjusted position by tightening the nut 74 on the screw 36.

The constantan conductor 82 is connected to the tie bar 60 at 84 as by silver solder. Current from the main thermocouple is connected to the armature 40 by the conductor 82, tie bar 60, spiral bimetallic compensator 56, tie bar 52, spring 48 and arm 44 to one side of the coil 40, and from another arm similar to 44 by a copper wire to the other side of the junction of the thermocouple. The tie bar 60 may be formed of copper, brass or bronze or any suitable current conducting metal, and being dissimilar to the constantan, the junction 84 functions as a thermocouple, tending to create a motive force counter to that generated at the junction of the main thermocouple, not shown. Such counter electromotive force will of course cause a false reading of the meter. However, by employing the bimetallic spiral compensator, this counter electromotive force is compensated for by varying the effect of the counter spring 48. The meter is calibrated to indicate temperature at the main thermocouple.

It will thus be seen from the foregoing that should the meter be adjusted for, for example, room temperature of 70° Fahrenheit, then, if the meter is subjected to a higher temperature causing a counter electromotive force to be generated at the junction 84, this higher temperature will affect the bimetallic spiral compensator to change the tension on the spring 48. By properly adjusting the position of the adjustable anchor arm 70, the effective length of the spiral compensator 56 can be regulated, whereby it compensates within a fraction of a degree of the effects of the thermocouple 84. In this manner the true reading of temperature is obtained regardless of the temperature to which the meter is subjected.

While the form of embodiment herein shown and described constitutes a preferred form, it is to be understood that other forms may be adopted falling within the scope of the claims that follow.

I claim:

1. In combination, an instrument including a frame; a rotatable shaft carried by the frame and movable by the instrument; a spring; means connecting one end of the spring to the shaft for movement with the shaft, said spring having a free end; a spirally shaped bimetal compensator having a free end, the other end of said spirally-shaped compensator being attached to the frame; means connecting the free end of the compensator with the free end of the spring; an anchor arm connected with the compensator remote from the said free end thereof, the connection between said arm and compensator being movable various distances radially of the center of the spirally shaped compensator and rotatable about said center; and means for fastening the arm in adjusted fixed position on the frame.

2. In combination, an instrument having a frame, an actuator carried by the frame, a rotatable shaft actuated by the actuator; a spring; means connecting one end of the spring to the shaft for movement with the shaft, said spring having a free end; a spirally shaped bimetal compensator having a free end, the other end of said spirally-shaped compensator being attached to the frame; means connecting the free end of the compensator with the free end of the spring; an anchor arm connected with the compensator remote from the said free end thereof; and pivotal fastening means for fastening the other end of the anchor to the frame, said fastening means being adjustable radially to the axis of the shaft to follow the spiral path of the compensator.

3. In combination, an instrument having a frame, an actuator carried by the frame, a rotatable shaft actuated by the actuator; a spring; means connecting one end of the spring to the shaft for movement with the shaft, said spring having a free end; a spirally shaped bimetal compensator having a free end, the other end of said spirally-shaped compensator being attached to the frame; means connecting the free end of the compensator with the free end of the spring; an anchor arm connected with the compensator remote from the said free end thereof, said arm being movable various distances radially of the center of the spirally shaped compensator and rotatable about said center; and means for fastening the arm in adjusted fixed position to the frame.

4. In combination, an instrument including:
   (A) A frame;
   (a) a rotatable shaft carried by the frame and movable by the instrument;
   (b) a spring;
   (c) means connecting one end of the spring to the shaft for movement with the shaft, said spring having a free end;
   (d) a spirally-shaped bimetal compensator having a free end;
   (e) a metallic conductor connecting the other end of the bimetal compensator to the frame;
   (f) means for insulating said conductor from the frame;
   (g) a conductor formed of metal which is dissimilar to that of the first mentioned conductor and connected with the first mentioned conductor and thereby forming a thermocouple;
   (h) means connecting the free end of the compensator with the free end of the spring;
   (i) an anchor arm connected with the compensator remote from the ends thereof, the connection between said arm and compensator being movable various distances radially of the center of the spirally-shaped compensator and rotatable about said center;
   (j) and means for fastening the arm in adjusted fixed position on the frame.

5. An instrument as defined in claim 4, including an actuator carried by the frame and connected with the shaft for rotating the latter.

References Cited in the file of this patent

UNITED STATES PATENTS

| | | |
|---|---|---|
| 1,288,019 | Johnson | Dec. 17, 1918 |
| 1,760,857 | Berg | May 27, 1930 |
| 2,016,894 | Faus | Oct. 8, 1935 |